April 16, 1957
C. J. DAVIS ET AL
2,788,906
TRACTOR MOUNTED MECHANICAL SHOVEL
Filed Nov. 8, 1954
2 Sheets-Sheet 1
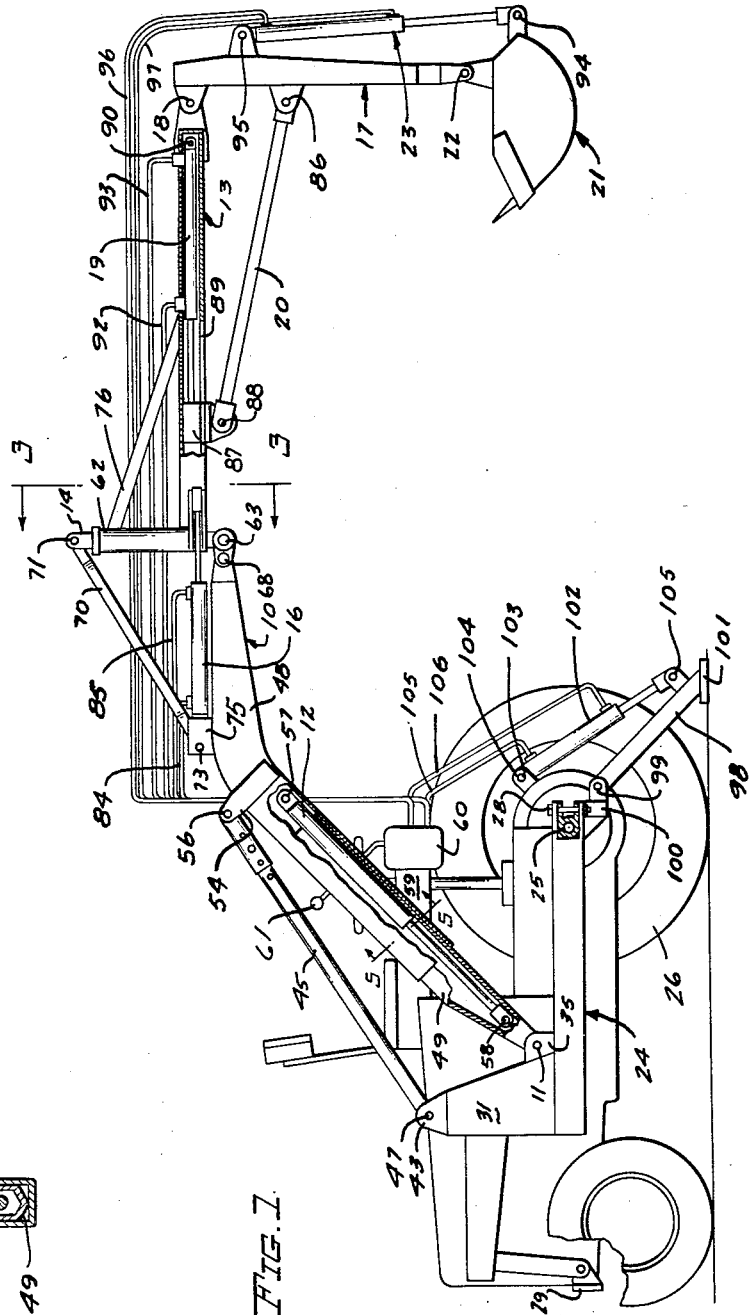
INVENTORS
JOHN I. MICHAELS
CARL A. LOESCH
CHARLES J. DAVIS
BY
ATTORNEY

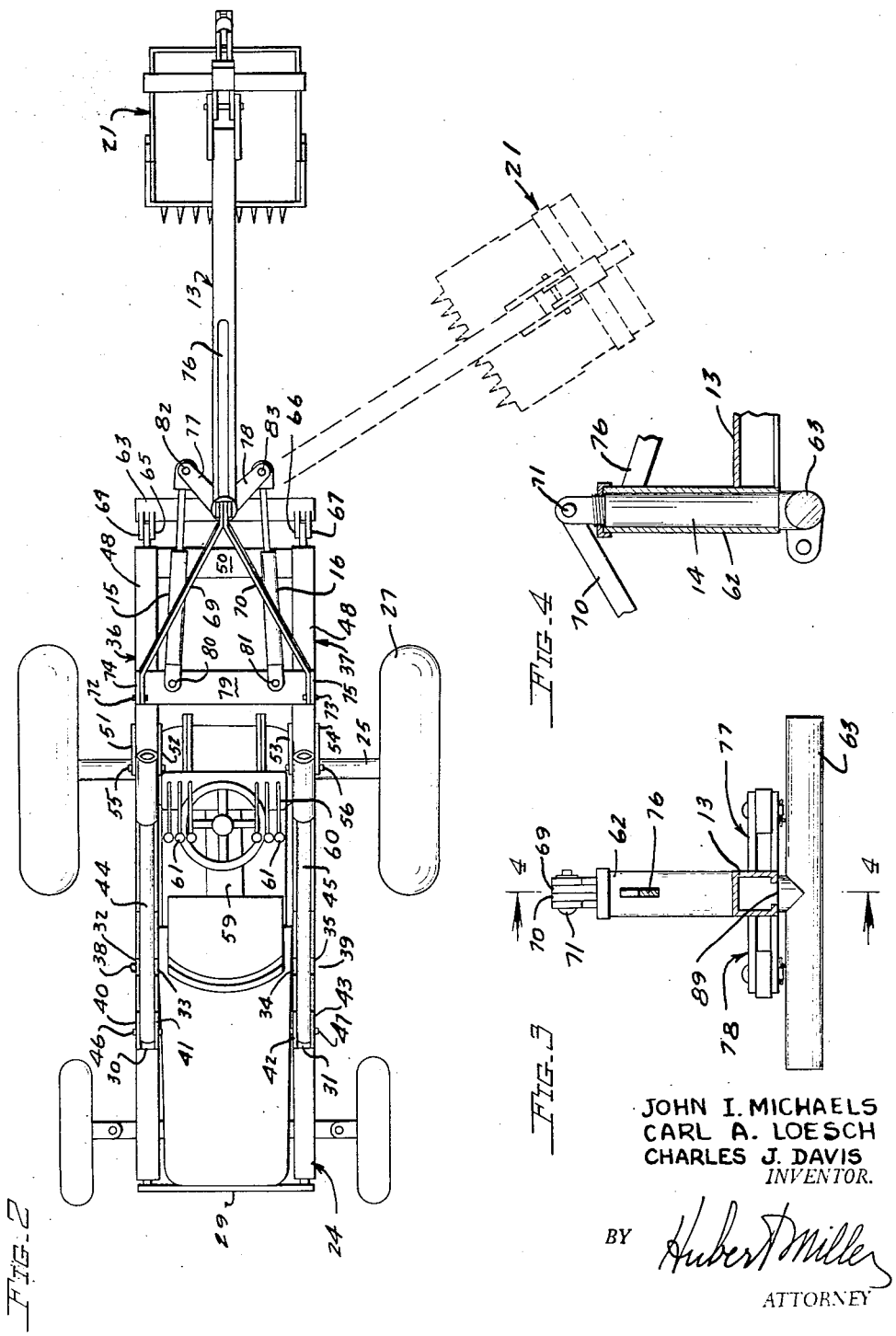

United States Patent Office 2,788,906
Patented Apr. 16, 1957

2,788,906

TRACTOR MOUNTED MECHANICAL SHOVEL

Charles J. Davis and John I. Michaels, Wichita, and Carl A. Loesch, Argonia, Kans., assignors to Mid-Western Industries, Inc., Wichita, Kans., a corporation of Kansas Application November 8, 1954, Serial No. 467,278

10 Claims. (Cl. 214—138)

This invention relates to a mechanical shovel adapted for mounting on a tractor.

A primary object is to provide a shovel of this class which is capable of being moved laterally to either side of the tractor while the tractor remains stationary.

Other objects are to provide apparatus under control of the operator by which the dipper bucket or similar working tool can be lowered to a level well below ground level, can be elevated to a level well above the tractor, and can be moved in an arc to either side of the tractor at any desired level; which provides operator control for independently adjusting the position of the dipper bucket for cutting angle, for loading, and for load dumping; and which permits the dipper bucket to dig, load or dump at a point remote from the tractor or at a point near one end thereof.

The invention, together with other objects attending its production, will be more clearly understood when the following description is read in connecton with the accompanying drawings, in which:

Fig. 1 is a side elevation of a mechanical shovel embodying the invention, shown mounted on a tractor, parts being cut away and shown in section for clarity, all fluid pressure lines being shown schematically;

Fig. 2 is a top plan view of the shovel shown in Fig. 1, the fluid pressure lines being omitted;

Fig. 3 is an enlarged sectional view showing details of a pivot connection between two parts of the shovel, and is taken along the line 3—3 of Fig. 1;

Fig. 4 is a vertical section taken along the line 4—4 of Fig. 3;

Fig. 5 is an enlarged sectional view through one boom member which constitutes a part of the device, and is taken along the line 5—5 of Fig. 1; and Fig. 6 is an enlarged fragmentary sectional view of a part of the boom operating mechanism.

GENERAL DESCRIPTION

Referring to Fig. 1, that embodiment of the invention illustrated in the drawings generally includes a boom 10 pivotally connected to the tractor on a transverse horizontal pivot axis 11, and extending beyond one end of the tractor for swinging movement in a vertical plane; power means 12, in the form of a pair of cooperating double acting fluid operated cylinders, for elevating and lowering the boom; a boom extension 13 having one end pivotally connected to the outer end of the boom on a pivot 14 which is disposed normal to the boom pivot axis 11, and which permits the extension to be oscillated in planes parallel to the boom pivot axis; power means 15—16, in the form of a pair of double acting fluid operated cylinders, for moving the boom extension about its pivot axis independent of the movement of or the position of the boom; a tool supporting arm 17 having one end pivoted at 18 on the outer end of the boom extension on a transverse pivot axis which permits the arm to be oscillated in planes substantially common to the boom extension pivot axis 14; power means 19, in the form of a double acting fluid operated cylinder and a connecting link 20, for moving arm 17 about its pivot axis independent of movement of the boom and of the boom extension; a working tool 21, shown in the form of a shovel or dipper bucket pivotally connected at 22 to the other end of arm 17 and also movable in planes common to the boom extension pivot 14; and power means 23, in the form of a double acting fluid operated cylinder, for moving the tool 21 independent of the movement of the arm 17, the boom extension 13, or the boom 10.

DETAILS OF CONSTRUCTION

The boom supporting frame

As shown in Figs. 1 and 2, this particular embodiment of the invention includes a generally U-shaped frame 24, the free ends of the two legs of the U being recessed to receive the rear axle housing 25 of the tractor, adjacent its two drive wheels 26 and 27. Bolts 28 rigidly secure the front end of the frame to the tractor. The frame cross bar 29 is bolted or otherwise secured to the front end of the tractor.

The frame 24 includes a pair of rigid uprights 30 and 31 intermediate its ends, one carried by each side member of the frame. At its lower end each upright is provided with a pair of spaced perforated ears 32—33 and 34—35, which respectively receive and journal the respective rear ends of the two side members 36 and 37 of the boom 10, by means of pivot pins 38 and 39. These pivot pins are in alinement and constitute the boom pivot axis 11.

At its upper end each upright 30 and 31 carries a pair of spaced perforated ears 40—41 and 42—43, which receive and journal the respective aft ends of adjustable length boom tension links or pull bars 44 and 45, by means of pivot pins 46 and 47.

Boom and operating mechanism

The boom proper includes two hollow telescoping side members 36 and 37 which are identical in construction, and each of which includes an outer and forward member 48, telescoped over an inner and rear member 49. The forward members 48 are rigidly connected together near their outer ends by a cross member 50 (Fig. 2) welded to each boom side member. The two telescoping parts 48 and 49 which make up each boom side member are preferably of box section, as clearly shown in Fig. 5, to better withstand torsional strains, as well as direct bending loads.

Intermediate its ends each of the boom members 48 is provided with a pair of spaced ears 51—52 and 53—54 (Fig. 2), which receive and pivotally connect the outer ends of the respective tension members 44 and 45 by means of pivot pins 55 and 56.

Each of the boom side members 36 and 37 houses identical double acting working cylinders 12, as shown in Fig. 1. One end of the cylinder proper is pivotally connected at 57 to the boom section 48, while the outer end of the working cylinder plunger rod is pivotally connected at 58 to the boom section 49. Each of the boom operating cylinders 12 is connected by hydraulic lines (not shown) to a power driven pump 59 through a master control valve 60. The valve is controlled by a series of levers 61.

Thus when the cylinders 12 are lengthened boom sections 48 are moved outward on boom sections 49, tension links 44 and 45 are placed in tension, and force the boom to swing upward in a vertical arc. Shortening of cylinders 12 by reversing fluid pressure forces the boom to lower.

Boom extension assembly and operating mechanism

The boom extension 13 includes an elongated box section tube, as clearly shown in Fig. 3. A cylindrical sleeve 62 has one end rigidly secured, as by welding, to one end of the tube 13 at right angles thereto. Sleeve 62 journals and is pivotally connected to the boom 10 by pivot pin 14, which constitutes the upright leg of an inverted T-shaped member, the cross leg of which is indicated by numeral 63. Near each of its ends cross leg 63 is provided with a pair of spaced perforated ears 64—65 and 66—67 (Fig. 2). These ears receive between them the respective outer ends of the two boom members 36 and 37, and are connected thereto by means of a pair of identical pins 68 (Fig. 1).

The upper end of pivot 14 is bifurcated and is connected to the upper ends of a pair of angle braces 69 and 70 by means of a pin 71. The braces diverge laterally and downwardly from the upper end of pin 14, and their lower ends are rigidly connected to the respective boom members by means of pins 72 and 73 passing through bracket ears 74 and 75 rigidly carried by the respective boom side members. An angle brace 76 has its upper end connected to the upper end of sleeve 62, as by welding, and has its lower end similarly connected to extension member 13, intermediate its ends. The truss type pivot mounting and the truss type boom extension, together with the boom proper, thus constitute a composite cantilever type boom which will withstand extreme direct bending loads, and which also possesses high torsional rigidity. With the described pivot connection the boom extension is capable of being oscillated in planes substantially parallel to the boom pivot axis, regardless of boom elevation, as shown by the broken lines in Fig. 2.

The double acting fluid operated cylinders 15 and 16 constitute the power means for moving the boom extension 13 about its pivot axis. To this end the pivoted inner end of extension 13 is provided with a pair of rigidly connected arms 77 and 78, one extending laterally from each side of the extension, as clearly shown in Figs. 2 and 3. One end of each of the cylinders 15 and 16 is pivotally connected to a boom carried plate 79 by means of pivot pins 80 and 81 (Fig. 2). The plunger rods of the respective cylinders are pivotally connected to the outer ends of the respective arms 77 and 78 by means of pivot pins 82 and 83. The cylinders 15 and 16 are connected to the fluid pressure control valve 60 by means of pressure lines 84 and 85. Thus when cylinder assembly 15 is elongated and cylinder assembly 16 is simultaneously shortened a powerful force is transmitted to the boom extension to move it toward the position shown in broken lines in Fig. 2. The boom extension can thus be oscillated under the control of the operator independent of the movement or of the relative position of the boom proper.

Tool supporting arm assembly

A tool supporting arm or dipper arm 17 has one end pivotally connected to the outer end of the boom extension 13 by means of a pivot pin 18. This pivot 18 is disposed normal to the boom extension pivot 14, and allows arm 17 to be oscillated in planes substantially common to pivot 14.

A link 20 has one end pivotally connected at 86 to arm 17, and has its other end pivotally connected to a traveler or slide 87 at point 88. Traveler 87 slides longitudinally within boom extension 13, and its movement is thereby guided. The lower end of the traveler projects thru a longitudinally disposed slot 89 in the boom extension. This slot not only aids in guiding traveler movement but also serves to limit its movement in both directions.

As a power means for moving arm 17, through movement of traveler 87 and connected link 20 (Fig. 1), a double acting fluid operated cylinder 19 is housed in the outer end of boom extension 13. One end of the cylinder is connected to the extension by a cross pin 90, while the plunger rod is connected to the traveler, as by threaded engagement. Lines 92 and 93 connect the opposite ends of the cylinder with the source of fluid pressure. The tool supporting arm 17 may thus be oscillated under control of the operator, independent of the movement or of the positions of either the boom extension or of the boom proper.

A shovel, dipper or other work contacting tool 21 is pivotally connected to the lower end of arm 17 by means of a pivot pin 22. The pivot is so disposed that the tool may be oscillated in a plane common to its supporting arm 17. At a point on the tool spaced from pivot 22 the tool is pivotally connected by pin 94 to one end of a double acting fluid pressure operated cylinder assembly 23. The other end of the cylinder assembly is pivotally connected at 95 to arm 17. Lines 96 and 97 connect the opposite ends of the cylinder proper to the source of fluid pressure. Under control of the operator the tool may be locked in a desired position with relation to its supporting arm 17, or it may be pivoted in either direction to assist in loading, digging or dumping. Such movement is possible regardless of the movement of or the relative positions of the arm 17, the boom extension 13, or of the boom proper, 10.

While not an essential part of the invention, we prefer to provide a pair of identically laterally spaced tractor stabilizing braces which cooperate to reduce the tendency of one end of the tractor to rotate about that wheel axis which is nearest the working tool end of the apparatus described.

One such brace is clearly shown in Fig. 1. Since both are identical, description of one will suffice.

The brace is a rigid elongated member 98 having one end pivotally connected at 99 to a tractor mounted bracket 100. The other end of the brace carries an enlarged ground plate or anchor 101. A double acting fluid pressure operated cylinder assembly 102 has one end pivotally connected at 103 to a tractor mounted bracket 104. The other end of the cylinder assembly is pivotally connected at 105 to the outer or lower end of brace 98. Lines 105 and 106 connect the opposite ends of the cylinder with the source of fluid pressure. The cylinder assembly 102 can thus be controlled by the operator to properly position the lower end of the brace against the ground or other supporting surface, regardless of ground irregularities, and the braces thus serve to provide a broader base support for the mechanical shovel of this invention.

From the above description it will be seen that while the boom proper is incapable of moving in a horizontal arc, the invention provides for such movement of the working tool by the manner in which the boom extension is constructed and mounted. The working tool can thus be lowered to perform its work at a point spaced laterally from the tractor proper, and can lift and dump its load at a much higher elevation on the opposite side of the tractor, if desired.

Having disclosed the invention with sufficient clarity to enable those familiar with this art to construct and use it, we claim:

1. A tractor mounted mechanical shovel comprising: a rigid boom including a pair of spaced interconnected arms; means pivotally connecting the inner end of said boom to the tractor for movement in a vertical plane; a transversely disposed rigid member rigidly connecting the spaced ends of said arms at the outer free end of said boom; an elongated pivot pin lying in a vertical plane and having one end rigidly connected to said transversely disposed member intermediate the ends thereof; rigid brace members connected to and extending between the other end of said pivot pin and the respective boom arms intermediate the ends thereof to maintain said pivot pin in fixed position with relation to said boom; a rigid elongated sleeve rotatably mounted on said pivot pin; an elongated boom extension having one end rigidly secured to one end of said sleeve; a rigid elongated brace member having one end rigidly secured to the other end of said sleeve, the opposite end of said brace member being rigidly secured to the boom extension at a point spaced from said sleeve to prevent relative movement between the brace member and boom extension, the arrangement described permitting only lateral pivotal movement of the boom extension with relation to the boom and constituting a cantilever type support between the boom and boom extension; and power means for moving the boom extension laterally about its fixed pivot axis.

2. The shovel described in claim 1, and a tool supporting arm having one end pivotally connected to the outer end of the boom extension; and power means for moving the tool supporting arm about its pivot axis.

3. The shovel described in claim 2, and a tool pivotally connected to the other end of the tool supporting arm; and power means for independently moving the tool about its pivot axis.

4. A tractor mounted mechanical shovel comprising: a boom extending from a pivot connection on the tractor to a point beyond one end of the tractor; power means for raising and lowering the boom about its pivot point; an upright pivot pin fixed on the outer end of the boom; an elongated rigid boom extension; an upright pivot sleeve rigidly secured to one end of the boom extension and rotatably mounted on said pivot pin; a first cantilever brace having one end secured to the boom intermediate its ends and having its opposite end secured to the pivot pin at a point spaced from the point of connection between pivot pin and boom; a second cantilever brace having one end secured to the boom extension intermediate its ends and having its other end secured to the sleeve at a point spaced from the point of connection between sleeve and boom extension; and power means for moving the boom extension laterally about its fixed pivot axis.

5. The shovel described in claim 4 in which the power means for moving the boom extension includes a rigid control arm extending laterally from the boom extension at a point near the latter's pivot axis; and a power extensible member connected to the control arm and to the boom to forcibly move the boom extension about its pivot axis.

6. The shovel described in claim 4, and a dipper arm pivotally connected to the outer end of the boom extension; and power means connected to the boom extension and to the dipper arm for forcibly moving the latter about its pivot axis.

7. The shovel described in claim 6 in which the power means to move the dipper arm comprises: a traveler movable along the boom extension; an extensible power unit having one end connected to the boom extension and its other end connected to the traveler; and a rigid link having one end pivotally connected to the traveler and its other end pivotally connected to the dipper arm intermediate its ends, whereby when the traveler is forced to move by the power unit, the link forces the dipper arm to pivot about its pivot axis.

8. A mechanical shovel attachment for a tractor or similar self propelled vehicle comprising: a boom including means for pivotally connecting its inner end to the tractor on a horizontal axis, which affords relative movement of the boom only in a plane perpendicular to said horizontal axis; an upright pivot post rigidly secured to the outer end of the boom against movement in any direction with relation thereto, and lying in a plane perpendicular to the horizontal boom pivot axis; a boom extension having one end pivotally attached to said pivot post to swing thereabout only in a plane perpendicular to said post, such movement being the only permitted relative movement between the boom extension and the boom; and independent power means for independently swinging both the boom and the boom extension about their respective perpendicularly disposed axes.

9. The shovel described in claim 8, and a tool supporting arm having one end pivotally connected to the outer end of the boom extension; and power means for moving the tool supporting arm about its pivot axis.

10. The shovel described in claim 9, and a tool pivotally connected to the other end of the tool supporting arm; and power means for independently moving the tool about its pivot axis.

References Cited in the file of this patent

UNITED STATES PATENTS

| | | |
|---|---|---|
| D. 162,873 | Pilch | Apr. 10, 1951 |
| 2,622,749 | Stuhr | Dec. 23, 1952 |
| 2,669,367 | Wills et al. | Feb. 16, 1954 |